United States Patent [19]

Otsuka et al.

[11] 4,450,680
[45] May 29, 1984

[54] AIR/FUEL RATIO CONTROL SYSTEM FOR INTERNAL COMBUSTION ENGINES, HAVING SECONDARY AIR SUPPLY CONTROL

[75] Inventors: Kazuo Otsuka, Higashikurume; Shin Narasaka, Yono; Hasegawa, Shumpei Niiza, all of Japan

[73] Assignee: Honda Giken Kogyo Kabushiki Kaisha, Tokyo, Japan

[21] Appl. No.: 290,800

[22] Filed: Aug. 6, 1981

[30] Foreign Application Priority Data

Aug. 12, 1980 [JP] Japan .............................. 55-111478

[51] Int. Cl.³ ...................... F02B 75/10; F01N 3/22
[52] U.S. Cl. ..................................... 60/274; 60/276; 60/290; 60/293
[58] Field of Search .............. 60/276, 285, 289, 293, 60/290, 274; 123/440, 489, 589, 479

[56] References Cited

U.S. PATENT DOCUMENTS

| | | | |
|---|---|---|---|
| 3,986,352 | 10/1976 | Casey | 60/276 |
| 4,024,707 | 5/1977 | Schmidt | 60/276 |
| 4,075,834 | 2/1978 | Saito | 60/276 |
| 4,148,188 | 4/1979 | Tokura | 60/276 |
| 4,149,376 | 4/1979 | Masaki | 60/276 |
| 4,155,335 | 5/1979 | Hosaka | 60/276 |
| 4,186,691 | 2/1980 | Takase | 60/276 |
| 4,222,237 | 9/1980 | Kohama | 60/276 |
| 4,363,209 | 12/1982 | Atago | 60/276 |

*Primary Examiner*—Douglas Hart
*Attorney, Agent, or Firm*—Lyon & Lyon

[57] ABSTRACT

An air/fuel ratio control system for use with an internal combustion engine, which includes a three-way catalyst arranged in the exhaust system of the engine, an electrical circuit operatively connecting an $O_2$ sensor with fuel quantity adjusting means in a manner effecting feedback control of the air/fuel ratio of a mixture produced by the fuel quantity adjusting means and being supplied to the engine, in response to an output signal produced by the $O_2$ sensor, and secondary air supply means for supplying atmospheric air into the exhaust system at a zone upstream of the $O_2$ sensor. The secondary air supply means is adapted to operate only during open loop control of the air/fuel ratio.

8 Claims, 3 Drawing Figures

AIR/FUEL RATIO CONTROL SYSTEM FOR INTERNAL COMBUSTION ENGINES, HAVING SECONDARY AIR SUPPLY CONTROL

BACKGROUND OF THE INVENTION

This invention relates to an air/fuel ratio control system for performing feedback control of the air/fuel ratio of an air/fuel mixture being supplied to an internal combustion engine, and more particularly to a device provided in such system for controlling a secondary air valve so as to supply secondary air into the exhaust system of the engine under particular open loop control conditions for enhanced purification of exhaust gas ingredients by means of a three-way catalyst.

An air/fuel ratio control system for use with an internal combustion engine having an intake pipe has already been proposed by the assignee of the present application, which comprises a three-way catalyst provided in the exhaust system of the engine, an $O_2$ sensor for detecting the concentration of oxygen in exhaust gases emitted from the engine, fuel quantity adjusting means for producing an air/fuel mixture being supplied to the engine, and an electrical circuit operatively connecting the $O_2$ sensor with the fuel quantity adjusting means in a manner effecting feedback control operation to control the air/fuel ratio of the mixture to a predetermined value in response to an output signal produced by the $O_2$ sensor.

Internal combustion engines for automotive vehicles are generally provided with three-way catalysts in their exhaust systems for purifying ingredients of HC and CO in the exhaust gases. It is also known to use a secondary air valve for supplying atmospheric air into the engine exhaust system at a zone upstream of the $O_2$ sensor to cause combustion of the HC and CO ingredients in the exhaust gases under an oxidizing atmosphere for better purification of these ingredients by a three-way catalyst arranged in the exhaust system.

However, according to the aforementioned air/fuel ratio control system, the air/fuel ratio of the mixture is controlled by means of feedback to a predetermined value in response to the output signal of the $O_2$ sensor, as noted above. Therefore, if the supply of secondary air into the engine exhaust system is carried out during the feedback control operation, the output signal of the $O_2$ sensor which is located downstream of the secondary air supplying zone in the engine exhaust system does not represent a proper air/fuel ratio on the basis of which the air/fuel ratio is to be controlled, thus impeding accurate air/fuel ratio feedback control.

OBJECT AND SUMMARY OF THE INVENTION

It is therefore the object of the invention to provide an air/fuel ratio control system for internal combustion engines, which is arranged to effect the supply of secondary air into the engine exhaust system in synchronism with air/fuel ratio control in open loop mode, with no influence upon the air/fuel ratio feedback control.

According to the invention, there is provided an air/fuel ratio control system for performing feedback control of the air/fuel ratio of an air/fuel mixture being supplied to an internal combustion engine having an intake system and an exhaust system, which includes a three-way catalyst provided in the exhaust system of the engine, an $O_2$ sensor also provided in the exhaust system at a location upstream of the three-way catalyst for detecting the concentration of an exhaust gas ingredient emitted from the engine, fuel quantity adjusting means for producing the mixture being supplied to engine, and an electrical circuit operatively connecting the $O_2$ sensor with the fuel quantity adjusting means in a manner effecting feedback control operation to control the air/fuel ratio of the mixture to a predetermined value in response to an output signal produced by the $O_2$ sensor. The air/fuel ratio control system is characterized by comprising in combination: secondary air supply means for supplying atmospheric air into the exhaust system of the engine at a location between the engine and the $O_2$ sensor, an engine speed sensor for detecting the rotational speed of the engine, a pressure sensor for detecting absolute pressure in the intake system of the engine, means for determining activation of the $O_2$ sensor, means connected to the engine speed sensor, the pressure sensor and the $O_2$ sensor activation determining means, for producing a feedback control interrupting signal when there occurs at least one of conditions of engine idle, engine deceleration and deactivation of the $O_2$ sensor, and means responsive to the feedback control interrupting signal for actuating the secondary air supply means.

The above and other objects, features and advantages of the invention will be more apparent from the ensuing detailed description taken in connection with the accompanying drawings in which:

DETAILED DESCRIPTION

The air/fuel ratio control system according to the invention will now be described in detail with reference to the accompanying drawings wherein an embodiment of the invention is illustrated.

Figure 1:
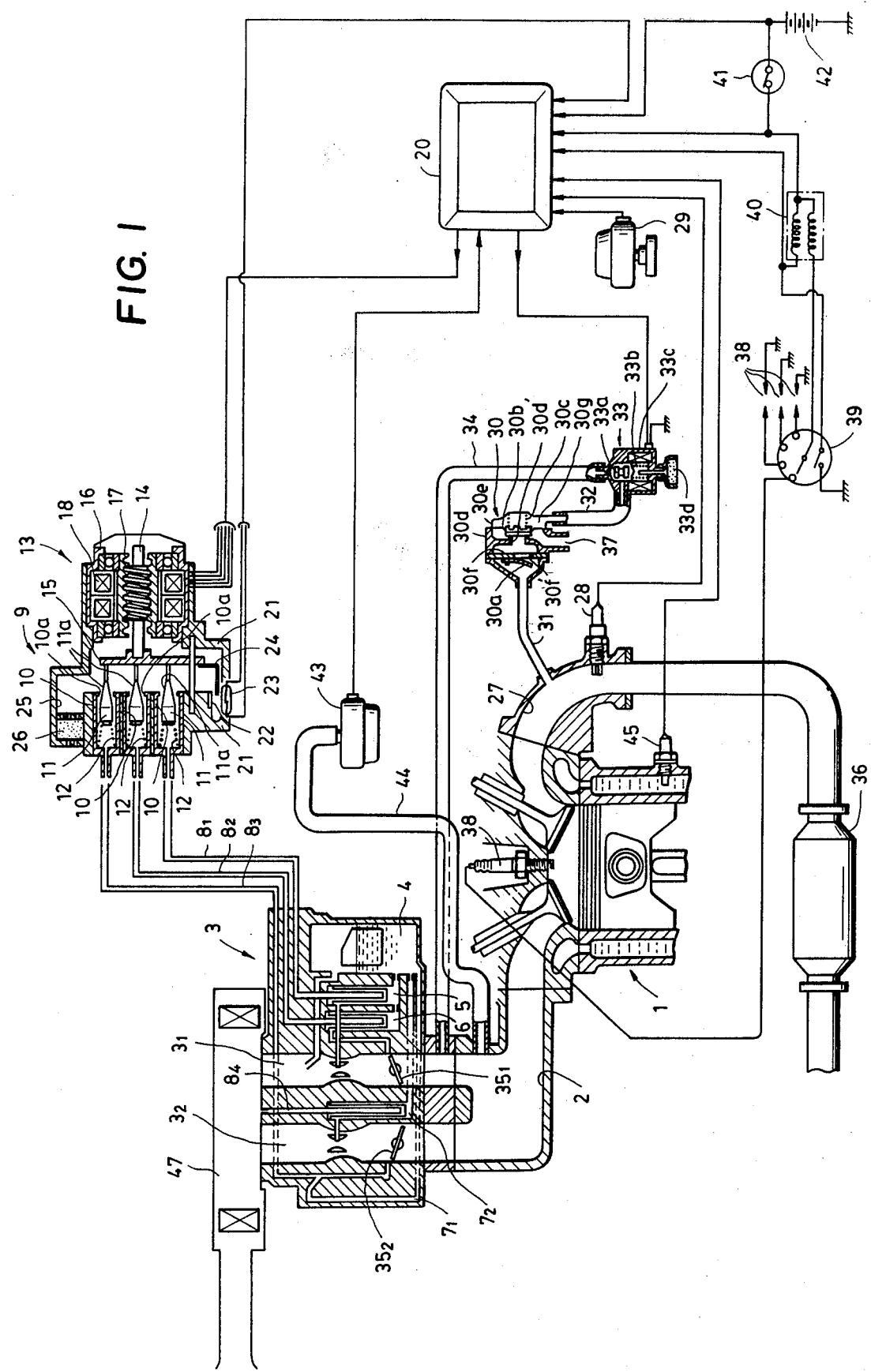
FIG. 1 is a diagrammatic view illustrating the whole arrangement of an air/fuel ratio control system according to the present invention.

Referring now to FIG. 1, there is illustrated the whole system of the invention. Reference numeral 1 designates an internal combustion engine. Connected to the engine 1 is an intake manifold 2 which is provided with a carburetor generally designated by the numeral 3. The carburetor 3 has fuel passages 5, 6 which communicate a float chamber 4 with the primary bore $3_1$ of the carburetor 3. These fuel passages 5, 6 are connected to an air/fuel ratio control valve generally designated by the numeral 9, via air bleed passages $8_1$, $8_2$. The carburetor 3 also has fuel passages $7_1$, $7_2$ communicating the float chamber 4 with the secondary bore $3_2$ of the carburetor 3. The fuel passage $7_1$, on one hand, is connected to the above air/fuel ratio control valve 9 via an air passage $8_3$ and, on the other hand, opens in the secondary bore at a location slightly upstream of a throttle valve $30_2$ in the secondary bore $3_2$. The fuel passage $7_2$ communicates with the interior of an air cleaner 47 via an air passage $8_4$ having a fixed orifice. The control valve 9 is comprised of three flow rate control valves, each of which is formed of a cylinder 10, a valve body 11 displaceably inserted into the cylinder 10, and a coil spring 12 interposed between the cylinder 10 and the valve body 11 for urging the valve body 11 in a predetermined direction. Each valve body 11 is tapered along its end portion 11a remote from the coil spring 12 so that the effective opening area of the opening 10a of each cylinder 10, in which the tapered portion 11a of the valve body is inserted, varies as the valve body 11 is moved. Each valve body 11 is disposed in urging contact with a connection plate 15 coupled to a worm element 14 which is axially movable but not rotatable about its own axis. The worm element 14 is in threaded engagement with the rotor 17 of a pulse motor 13 which is arranged about the element 14 and rotatably supported by radial bearings 16. Arranged about the rotor 17 is a solenoid 18 which is electrically connected to an electronic control unit (hereinafter called "ECU") 20. The solenoid 18 is energized by driving pulses supplied from ECU 20 to cause rotation of the rotor 17 which in turn causes movement of the worm element 14 threadedly engaging the rotor 17 in the leftward and rightward directions as viewed in FIG. 1. Accordingly, the connection plate 15 coupled to the worm element 14 is moved leftward and rightward in unison with the movement of the worm element 14.

The pulse motor 13 has its stationary housing 21 provided with a permanent magnet 22 and a reed switch 23 arranged opposite to each other. The plate 15 is provided at its peripheral edge with a magnetic shielding plate 24 formed of a magnetic material which is interposed between the permanent magnet 22 and the reed switch 23 for movement into and out of the gap between the two members 22, 23. The magnetic shielding plate 24 is displaced in the leftward and rightward directions in unison with displacement of the plate 15 in the corresponding directions. The reed switch 23 turns on or off in response to the displacement of the plate 24. That is, when the valve body 11 of the air/fuel ratio control valve 9 passes a reference position which is determined by the positions of the permanent magnet 22, reed switch 23 and magnetic shielding plate 24, the reed switch 23 turns on or off depending upon the moving direction of the valve body 11, to supply a corresponding binary output signal to ECU 20.

Incidentally, the pulse motor housing 21 is formed with an air intake 25 communicating with the atmosphere. Air is introduced through a filter 26 mounted in the air intake 25, into each flow rate control valve in the housing 21.

On the other hand, an $O_2$ sensor 28, which is made of stabilized zirconium oxide or the like, is mounted in the peripheral wall of the exhaust manifold 27 of the engine 1 in a manner partly projecting in the manifold 27. The sensor 28 is electrically connected to ECU 20 to supply its output signal thereto. An atmospheric pressure sensor 29 is arranged to detect the ambient atmospheric pressure surrounding the vehicle, not shown, in which the engine 1 is installed, and also electrically connected to ECU 20 to supply its output signal thereto. Further provided is a pressure sensor 43 which is arranged to detect the intake pressure (absolute pressure) in the intake manifold 2 through a conduit 44 which opens in the inner wall of the manifold 2 at a zone downstream of the throttle valves $35_1$, $35_2$. The pressure sensor 43 is also electrically connected to ECU 20 to supply its output signal thereto. A thermistor 45 is inserted in the peripheral wall of the engine cylinder, the interior of which is filled with engine cooling water, to detect the temperature of the engine cooling water as the engine temperature and supply its output signal to ECU 20 to which it is connected.

Reference numeral 30 designates a secondary air valve. This valve 30 has a housing 30d which is connected to one end of a conduit 31 which in turn has its other end opening in the inner wall of the exhaust manifold 27. The housing 30d is provided therein with a partition wall 30f having a through hole 30f'. The partition wall 30f has a reed 30a mounted on its side surface facing the conduit 31 to close and open the through hole 30f'. Thus, atmospheric air is allowed to flow only toward the exhaust manifold 27 through the through hole 30f'. The wall of the housing 30d remote from the exhaust manifold 27 is formed with an opening 30d' which is closable by a diaphragm 30b mounted on the housing 30d. Further, a cover 30e is mounted on the housing 30d in a fashion enclosing the diaphragm 30b, with its one end connected to the housing 30d and its other end to a corresponding end of a conduit 32, respectively. Interposed between the cover 30e and the diaphragm 30b is a spring 30c which urges the diaphragm 30b in the direction of closing the opening 30d'. The diaphragm 30b and the cover 30e form a valve for closing the opening 30d', in cooperation with the spring 30c, and also define a negative pressure chamber 30g therebetween to provide negative pressure-actuated means for actuating the above valve for closing the opening 30d'.

The secondary air valve 30 is, on one hand, connected to the exhaust manifold 27 of the engine 1, through the conduit 31, and, on the other hand, to the air cleaner 47, that is, communicating with the atmosphere, through a conduit 37. The above-mentioned conduit 32 communicates the valve 30 with a control valve 33 which is formed of a solenoid controlled valve. The valve 33 in turn communicates with the intake manifold 2 at a zone downstream of the throttle valves $35_1$, $35_2$ via a conduit 34. The conduit 31 opens in the exhaust manifold 27 at a location upstream of the $O_2$ sensor 28. A three-way catalyst 36 is arranged across the exhaust output downstream of the $O_2$ sensor 28. The solenoid controlled valve 33 is a three way valve which is comprised of a valve body 33a disposed for interrupting the communication between the conduits 32, 34, a spring 33b disposed to permanently urge the valve body 33a in its closing direction, a solenoid 33c disposed to be energized by a control signal from ECU 20, and an air intake 33d arranged for communication with the conduit 32 when the valve is closed. When the solenoid 33c is energized, the valve 33 allows negative pressure produced in the intake manifold 2 at a zone downstream of the throttle valves $35_1$, $35_2$ during operation of the engine to be introduced into the secondary air valve 30. The introduced negative pressure retracts the diaphragm 30b of the valve 30 to allow air (secondary air) to be introduced into the valve 30 through the conduit 37. Then, when negative pressure is produced in the exhaust manifold 27, this air urges the reed 30a into its open position to be introduced into the exhaust manifold 27. This introduction of secondary air into the exhaust manifold 27 causes dilution of the exhaust gases with the secondary air to place the three-way catalyst 36 under an oxidizing atmosphere wherein HC and CO in the exhaust gases are well burned to obtain good purification of the exhaust gases.

However, if the above secondary air introduction is carried out by the reed valve 30 during air/fuel ratio feedback control based upon the detected value signal outputted from the $O_2$ sensor 28 which will be hereinlater referred to, the detected value signal of the $O_2$ sensor which is located downstream of the opening of the conduit 31 does not represent a proper air/fuel ratio, on the basis of which feedback control of the air/fuel ratio is to be carried out. Therefore, during feedback control of the air/fuel ratio the reed valve 30 is held inoperative by means of the solenoid controlled valve 33 which is actuated by the control signal outputted from ECU 20, that is, the valve 30 is made to operate only when particular open loop control conditions are met where the air/fuel ratio feedback control is not carried out.

In FIG. 1, reference numeral 38 designates an ignition plug, 39 a distributor, 40 an ignition coil, 41 an ignition switch, and 42 a battery, respectively. The distributor 39 has a drive shaft, not shown, which is arranged for rotation at a speed proportional to the engine speed, and accordingly pulses are produced in the ignition coil 40, which correspond in frequency to switching of contact points or the output of a contactless pickup, the contact points or the contactless pickup being arranged to operate in synchronism with the rotation of the above drive shaft. The above pulses produced in the coil 40 are supplied to ECU 20. It will be noted that in the illustrated embodiment the distributor 39 and the ignition coil 40 form an engine rpm sensor.

Details of the air/fuel ratio control which can be performed by the air/fuel ratio control system according to the invention will now be described by reference to FIG. 1 which has been referred to hereinabove.

Initialization

Referring first to the initialization, when the ignition switch 41 in FIG. 1 is set on, ECU 20 is initialized to detect the reference position of the actuator or pulse motor 13 by means of the reed switch 23 and hence drive the pulse motor 13 to set it to its best position (a preset position) for starting the engine, that is, set the initial air/fuel ratio to a predetermined proper value. The above preset position of the pulse motor 13 is hereinafter called "$PS_{CR}$". This setting of the initial air/fuel ratio is made on condition that the engine rpm Ne is lower than a predetermined value $N_{CR}$ (e.g., 400 rpm) and the engine is in a condition before firing. The predetermined value $N_{CR}$ is set at a value higher than the cranking rpm and lower than the idling rpm.

The above reference position of the pulse motor 13 is detected as the position at which the reed switch 23 turns on or off, as previously mentioned with reference to FIG. 1.

Then, ECU 20 monitors the condition of activation of the $O_2$ sensor 28 and the coolant temperature Tw detected by the thermistor 45 to determine whether or not the engine is in a condition for initiation of the air/fuel ratio control. For accurate air/fuel ratio feedback control, it is a requisite that the $O_2$ sensor 28 is fully activated and the engine is in a warmed-up condition. The $O_2$ sensor, which is made of stabilized zirconium dioxide or the like, has a characteristic that its internal resistance decreases as its temperature increases. If the $O_2$ sensor is supplied with electric current through a resistance having a suitable resistance value from a constant-voltage regulated power supply provided within ECU 20, the electrical potential or output voltage of the sensor initially shown a value close to the power supply voltage (e.g., 5 volts) when the sensor is not activated, and then, its electrical potential lowers with the increase of its temperature. Therefore, according to the invention, the air/fuel ratio feedback control is not initiated until after the conditions are fulfilled that the sensor produces an activation signal when its output voltage lowers down to a predetermined voltage Vx (e.g., 0.5 volt) a timer finishes counting for a predetermined period of time $t_x$ (e.g., 1 minute) starting from the occurrence of the above activation signal, and the coolant temperature Tw increases up to a predetermined value Twx at which the automatic choke is opened to an opening for enabling the air/fuel ratio feedback control.

During warming-up operation of the engine 1 where the $O_2$ sensor 28 is not yet activated and the temperature of the engine cooling water is still low, unburned ingredients are emitted in large quantities from the engine 1. The secondary air valve 30 is opened during such warming-up operation to allow the three-way catalyst 36 to operate under an oxidizing atmosphere to largely reduce the amount of the unburned ingredients. Further, this secondary air supply enables detection of the activation of the $O_2$ sensor in the lean or large air/fuel ratio region of the exhaust gases. If detection of the activation of the $O_2$ sensor is effected in the rich or small air/fuel ratio region to the contrary, the reference voltage Vx for comparison with the output voltage V of the $O_2$ sensor has to be set at a higher value and also the counting period of time $t_x$ of the timer has to be larger than in the case of detecting the $O_2$ sensor activation in the lean region, which necessitates retarded commencement of the air/fuel ratio feedback control so as to cope with variations in performance between engines to be used with the air/fuel ratio control system. This retarded air/fuel ratio control commencement leads to an increase in the amount of detrimental ingredients in the exhaust gases, depending upon the performance of an engine concerned. However, this disadvantage can be avoided by the detection of the $O_2$ sensor activation in the lean region.

During the above stage of the detection of activation of the $O_2$ sensor and the coolant temperature Tw, the pulse motor 13 is held at its predetermined position $PS_{CR}$. The pulse motor 13 is driven to appropriate positions in response to the operating condition of the engine after initiation of the air/fuel ratio control, as hereinlater described.

Basic Air/Fuel Ratio Control

Following the initialization, the program proceeds to the basic air/fuel ratio control.

ECU 20 is responsive to various detected value signals representing the output voltage of the $O_2$ sensor 28, the absolute pressure in the intake manifold 2 detected by the pressure sensor 43, the engine rpm Ne detected by the rpm sensor 39, 40, and the atmospheric pressure $P_A$ detected by the atmospheric pressure sensor 29, to drive the pulse motor 13 as a function of these signals to control the air/fuel ratio. More specifically, the basic air/fuel ratio control comprises open loop control which is carried out at wide-open-throttle, at engine idle, and at engine deceleration, and closed loop control which is carried out at engine partial load. All the control is initiated after completion of the warming-up of the engine.

First, the condition of open loop control at wide-open-throttle is met when the differential pressure $P_A - P_B$ (gauge pressure) between the absolute pressure $P_B$ detected by the pressure sensor 43 and the atmospheric pressure $P_A$ (absolute pressure) detected by the atmospheric pressure sensor 29 is lower than a predetermined value $\Delta P_{WOT}$. ECU 20 compares the difference in value between the output signals of the sensors 29, 43 with the predetermined value $\Delta P_{WOT}$ stored therein, and when the relationship of $P_A - P_B < \Delta P_{WOT}$ stands, drives the pulse motor 13 to a predetermined position (preset position) $PS_{WOT}$ and holds it there, which is a position best appropriate for the engine emissions to be obtained at the time of termination of the wide-open throttle open loop control. At wide-open-throttle, a known economizer, not shown, or the like is actuated to supply a rich or small air/fuel ratio mixture to the engine.

The condition of open loop control at engine idle is met when the engine rpm Ne is lower than a predetermined idle rpm $N_{IDL}$ (e.g., 1,000 rpm). ECU 20 compares the output signal value Ne of the rpm sensor 39, 40 with the predetermined rpm $N_{IDL}$ stored therein, and when the relationship of $Ne < N_{IDL}$ stands, drives the pulse motor 13 to a predetermined idle position (preset position) $PS_{IDL}$ which is best suitable for the engine emissions and holds it there.

The condition of open loop control at engine deceleration is fulfilled when the absolute pressure $P_B$ in the intake manifold is lower than a predetermined value $PB_{DEC}$. ECU 20 compares the output signal value $P_B$ of the pressure sensor 43 with the predetermined value $PB_{DEC}$ stored therein, and when the relationship of $P_B < PB_{DEC}$ stands, drives the pulse motor 13 to a predetermined deceleration position (preset position) $PS_{DEC}$ best suitable for the engine emissions and holds it there.

The ground for this condition of open loop control at engine deceleration lies in that when the absolute pressure $P_B$ in the intake manifold drops below the predetermined value, unburned HC is produced at an increased rate in the exhaust gases, to make it impossible to carry out the air/fuel ratio feedback control based upon the detected value signal of the O$_2$ sensor with accuracy, thus failing to control the air/fuel ratio to a theoretical value. Therefore, according to the invention, the open loop control is employed, as noted above, when the absolute pressure $P_B$ in the intake manifold detected by the pressure sensor 43 is smaller than the predetermined value $PB_{DEC}$, where the pulse motor is set to the predetermined position $PS_{DEC}$ best suitable for the engine emissions obtained at the time of termination of the deceleration open loop control. At the beginning of engine deceleration, a shot air valve, not shown, is actuated to supply air into the intake manifold to prevent the occurrence of unburned ingredients in the exhaust gases.

During operations of the above-mentioned open loop control at wide-open-throttle, at engine idle, at engine deceleration, the respective predetermined positions $PS_{WOT}$, $PS_{IDL}$, $PS_{DEC}$ for the pulse motor 13 are compensated for atmospheric pressure $P_A$, as hereinlater described.

On the other hand, the condition of closed loop control at engine partial load is met when the engine is in an operating condition other than the above-mentioned open loop control conditions. During the closed loop control, ECU 20 performs selectively feedback control based upon proportional term correction (hereinafter called "P term control") and feedback control based upon integral term correction (hereinafter called "I term control"), in response to the engine rpm Ne detected by the engine rpm sensor 39, 40 and the output signal of the O$_2$ sensor 28. To be concrete, the integral term correction is used when the output voltage of the O$_2$ sensor 28 varies only at the higher level side or only at the lower level side with respect to a reference voltage Vref, wherein the position of the pulse motor 13 is corrected by an integral value obtained by integrating the value of a binary signal which changes in dependence on whether the output voltage of the O$_2$ sensor is at the higher level or at the lower level with respect to the predetermined reference voltage Vref, to thereby achieve stable and accurate position control of the pulse motor 13. On the other hand, when the output signal of the O$_2$ sensor changes from the higher level to the lower level or vice versa, the proportional term correction is carried out wherein the position of the pulse motor 13 is corrected by a value directly proportional to a change in the output voltage of the O$_2$ sensor to thereby achieve air/fuel ratio control in a manner prompter and more efficient than the integral term correction.

As noted above, according to the above I term control, the pulse motor position is varied by an integral value by integrating the value of a binary signal corresponding to the change of the output voltage of the O$_2$ sensor. According to this I term control, the number of steps by which the pulse motor is to be displaced per second differs depending upon the speed at which the engine is then operating. That is, in a low engine rpm range, the number of steps by which the pulse motor is to be displaced is small. With an increase in the engine rpm, the above number of steps increases so that it is large in a high engine rpm range.

Whilst, according to the P term control which, as noted above, is used when there is a change in the output voltage of the O$_2$ sensor from the higher level to the lower one or vice versa with respect to the reference voltage Vref, the number of steps by which the pulse motor is to be displaced per second is set at a single predetermined value (e.g., 6 steps), irrespective of the engine rpm.

The air/fuel ratio control at engine acceleration (i.e., off-idle acceleration) is carried out when the engine rpm Ne exceeds the aforementioned predetermined idle rpm $N_{IDL}$ during the course of the engine speed increasing from a low rpm range to a high rpm range, that is, when the engine speed changes from a relationship $Ne < N_{IDL}$ to one $Ne \geq N_{IDL}$. On this occasion, ECU 20 rapidly moves the pulse motor 13 to a predetermined acceleration position (preset position) $PS_{ACC}$, and thereafter initiates the aforementioned air/fuel ratio feedback control. This predetermined position $PS_{ACC}$ is compensated for atmospheric pressure $P_A$, too, as hereinlater described.

The above-mentioned predetermined position $PS_{ACC}$ is set at a position where the amount of detrimental ingredients in the exhaust gases is small. Therefore, particularly at the so-called "standing start", i.e., acceleration from a vehicle-stopping position, setting the pulse motor position to the predetermined position $PS_{ACC}$ is advantageous to anti-exhaust measures, as well as to achievement of accurate air/fuel ratio feedback control to be done following the acceleration. This acceleration control is carried out under a warmed-up engine condition, too.

In transition from the above-mentioned various open loop control to the closed loop control at engine partial load or vice versa, changeover between open loop mode and closed loop mode is effected in the following manner: First, in changing from closed loop mode to open loop mode, ECU 20 moves the pulse motor 13 to an atmospheric pressure-compensated predetermined position $PSi(P_A)$ in a manner referred to later, irrespective of the position at which the pulse motor was located immediately before entering the open loop control. This predetermined position $PSi(P_A)$ includes preset positions $PS_{CR}$, $PS_{WOT}$, $PS_{IDL}$, $PS_{DEC}$ and $PS_{ACC}$, each of which is corrected in response to actual atmospheric pressure as hereinlater referred to. Various open loop control operations can be promptly done, simply by setting the pulse motor to the above-mentioned respective predetermined positions.

On the other hand, in changing from open loop mode to closed loop mode, ECU 20 commands the pulse motor 13 to initiate air/fuel ratio feedback control with I term correction. That is, there can be a difference in timing between the change of the output signal level of the $O_2$ sensor from the high level to the low level or vice versa and the change from the open loop mode to the closed loop mode. In such an event, the deviation of the pulse motor position from the proper position upon entering the closed loop mode, which is due to such timing difference, is much smaller in the case of initiating air/fuel ratio control with I term correction than that in the case of initiating it with P term correction, to make it possible to resume early accurate air/fuel ratio control and accordingly ensure highly stable engine emissions.

To obtain optimum exhaust emission characteristics irrespective of changes in the actual atmospheric pressure during open loop air/fuel ratio control or at the time of shifting from open loop mode to closed loop mode, the position of the pulse motor 13 needs to be compensated for atmospheric pressure. According to the invention, the above-mentioned predetermined or preset positions $PS_{CR}$, $PS_{WOT}$, $PS_{IDL}$, $PS_{DEC}$, $PS_{ACC}$ at which the pulse motor 13 is to be held during the respective open loop control operations are corrected in a linear manner as a function of changes in the atmospheric pressure $P_A$, using the following equation:

$$PSi(P_A) = PSi + (760 - P_A) \times Ci$$

where i represents any one of CR, WOT, IDL, DEC and ACC, accordingly PSi represents any one of $PS_{CR}$, $PS_{WOT}$, $PS_{IDL}$, $PS_{DEC}$ and $PS_{ACC}$ at 1 atmospheric pressure (=760 mmHg), and Ci a correction coefficient, representing any one of $C_{CR}$, $C_{WOT}$, $C_{IDL}$, $C_{DEC}$ and $C_{ACC}$. The values of PSi and Ci are previously stored in ECU 20.

ECU 20 applies to the above equation the coefficients PSi, Ci which are determined at proper different values according to the kinds of open loop control to be carried out, to calculate by the above equation the position $PSi(P_A)$ for the pulse motor 13 to be set at a required kind of open loop control and moves the pulse motor 13 to the calculated position $PSi(P_A)$.

By correcting the air/fuel ratio during open loop control in response to the actual atmospheric pressure in the above-mentioned manner, it is possible to obtain not only conventionally known effects such as best driveability and prevention of burning of the ignition plug in an engine cylinder, but also optimum emission characteristics by setting the value of Ci at a suitable value, since the pulse motor position held during open loop control forms an initial position upon entering subsequent closed loop control.

The position of the pulse motor 13 which is used as the actuator for the air/fuel ratio control valve 9 is monitored by a position counter provided within ECU 20. However, there can occur a disagreement between the counted value of the position counter and the actual position of the pulse motor due to skipping or racing of the pulse motor. In such an event, ECU 20 operates on the counted value of the position counter as if it were the actual position of the pulse motor 13. However, this can impede proper setting of the air/fuel ratio during open loop control where the actual position of the pulse motor 13 must be accurately recognized by ECU 20.

In view of the above disadvantage, according to the air/fuel ratio control system of the invention, in addition to detection of the initial position of the pulse motor 13 by regarding as the reference position (e.g., 50th step) the position of the pulse motor at which the reed switch 23 turns on or off when the pulse motor is driven, which was previously noted with reference to the initialization, the position counter has its counted value replaced by the number of steps corresponding to the reference position (e.g., 50 steps) stored in ECU 20 upon the pulse motor 13 passing the switching point of the reed switch 23, to thus ensure high reliability of subsequent air/fuel ratio control.

Control of Secondary Air Valve

The secondary air valve 30, which serves to create an oxidizing atmosphere in the interior of the three-way catalyst 36 for efficient purification of HC, CO ingredients in the exhaust gases as previously noted, needs to be held inoperative during air/fuel ratio feedback control for the reason previously mentioned. To this end, according to the invention, the secondary air valve 30 is operated in synchronism with the open loop control operations so as to avoid concurrence of the operation of the valve with the closed loop control operation. More specifically, the secondary air valve 30 is operated when there is fulfillment of any one of the conditions of open loop control operations at engine idle, at engine deceleration, at non-activation of the $O_2$ sensor and at engine low temperature (before warming-up of the engine). To this end, ECU 20 energizes the solenoid controlled valve 33 to actuate the secondary air valve 30 when any one of the following conditions a-c is fulfilled:

a. The aforementioned timer has not finished counting as yet, which is triggered by an activation signal from the $O_2$ sensor 28 to start counting for one minute for instance, or the engine coolant temperature Tw is lower than a predetermined value (e.g., 35° C.).

b. The engine rpm Ne is lower than a predetermined value (e.g., 1,000 rpm).

c. The absolute pressure $P_B$ in the intake manifold is lower than a predetermined value (e.g., 200 mmHg), that is, the negative pressure in the intake manifold is larger than the predetermined value.

Operation of the secondary air valve 30 at fulfillment of any one of the above requirements a, b, c will bring about the following results:

(i) The condition a corresponds to prewarming-up condition of the engine. Under such condition, CO, HC ingredients are present in large quantities in the exhaust gases. Purification of these ingredients can be effectively carried out by the three-way catalyst 36 due to operation of the valve 30.

(ii) The condition b corresponds to idling condition of the engine where NOx is present in small quantities in the exhaust gases. Purification of CO and unburned HC ingredients which are produced at engine idle is made by the three-way catalyst 36 due to operation of the valve 30.

(iii) The condition c corresponds to decelerated condition of the engine where NOx is present in small quantities in the exhaust gases. Purification of CO and unburned HC ingredients which are produced at engine deceleration is effected by the three-way catalyst due to operation of the valve 30.

The above values Tw, Ne, $P_B$ are detected, respectively, by the engine cooling water temperature sensor 45, rpm sensor 39, 40 and pressure sensor 43, all shown in FIG. 1.

Figure 2:
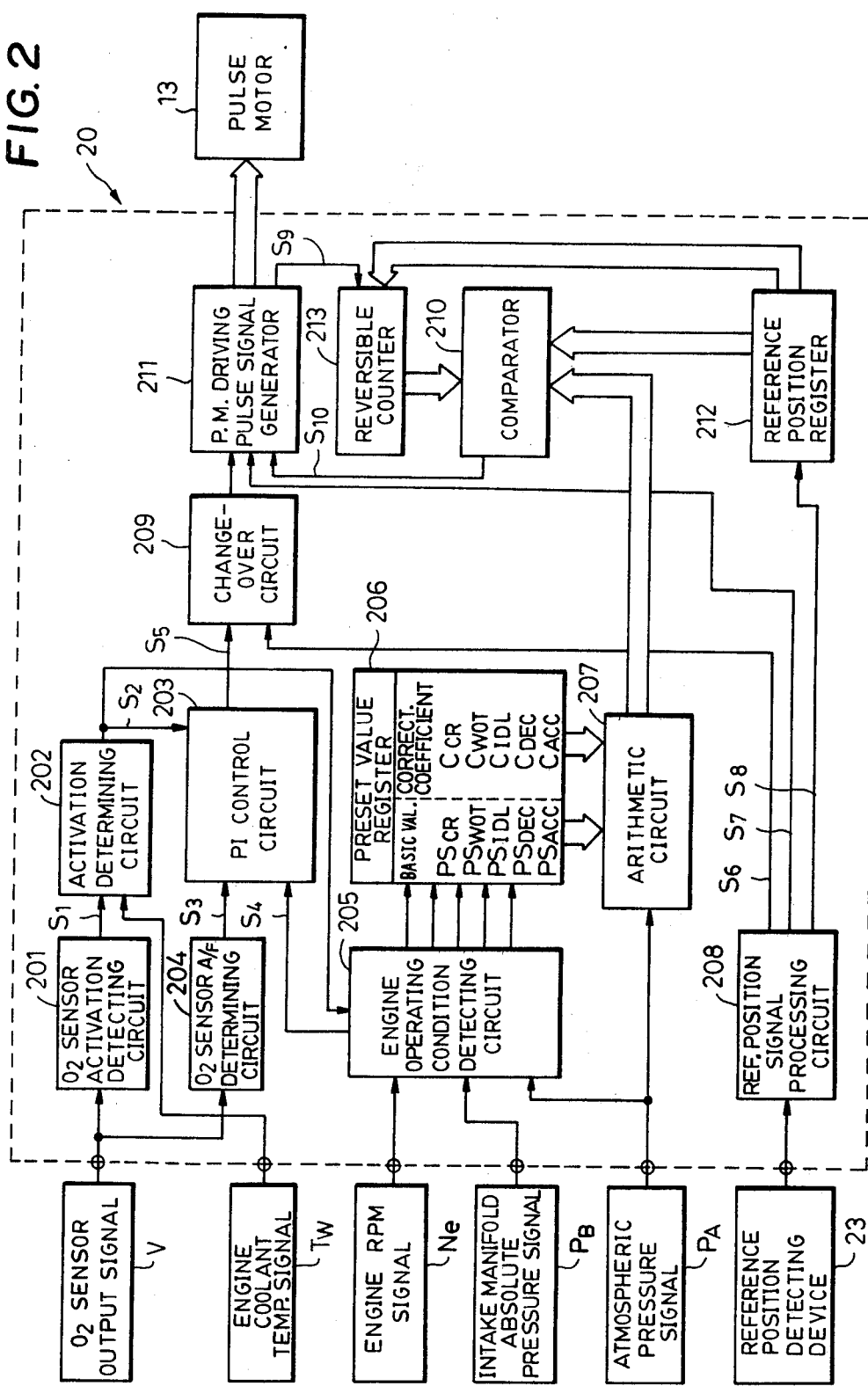
FIG. 2 is a block diagram illustrating the whole arrangement of an electrical circuit provided in the electronic control unit in FIG. 1.

FIG. 2 is a block diagram illustrating the interior construction of ECU 20 used in the air/fuel ratio control system having the above-mentioned functions according to the invention. In ECU 20, reference numeral 201 designates a circuit for detecting the activation of the O2 sensor 28 in FIG. 1, which is supplied at its input with an output signal V from the O2 sensor. Upon passage of the predetermined period of time Tx after the voltage of the above output signal V has dropped below the predetermined value Vx, the above circuit 201 supplies an activation signal $S_1$ to an activation determining circuit 202. This activation determining circuit 202 is also supplied at its input with an engine coolant temperature signal Tw from the thermistor 45 in FIG. 1. When supplied with both the above activation signal $S_1$ and the coolant temperature signal Tw indicative of a value exceeding the predetermined value Twx, the activation determining circuit 202 supplies an air/fuel ratio control initiation signal $S_2$ to a PI control circuit 203 to render same ready to operate. Reference numeral 204 represents an air/fuel ratio determining circuit which determines the value of air/fuel ratio of engine exhaust gases, depending upon whether or not the output voltage of the O2 sensor is larger than the predetermined value Vref, to supply a binary signal $S_3$ indicative of the value of air/fuel ratio thus obtained, to the PI control circuit 203. On the other hand, an engine condition detecting circuit 205 is provided in ECU 20, which is supplied with an engine rpm signal Ne from the engine rpm sensor 39, 40, an absolute pressure signal $P_B$ from the pressure sensor 43, an atmospheric pressure signal $P_A$ from the atmospheric pressure sensor 29, all the sensors being shown in FIG. 1, and the above control initiation signal $S_2$ from the activation determining circuit 202 in FIG. 2, respectively. The circuit 205 supplies a control signal $S_4$ indicative of a value corresponding to the values of the above input signals to the PI control circuit 203. The PI control circuit 203 accordingly supplies to a change-over circuit 209 to be referred to later a pulse motor control signal $S_5$ having a value corresponding to the air/fuel ratio signal $S_3$ from the air/fuel ratio determining circuit 204 and a signal component corresponding to the engine rpm Ne in the control signal $S_4$ supplied from the engine condition detecting circuit 205. The engine condition detecting circuit 205 also supplies to the PI control circuit 203 the above control signal $S_4$ containing a signal component corresponding to the engine rpm Ne, the absolute pressure $P_B$ in the intake manifold, atmospheric pressure $P_A$ and the value of air/fuel ratio control initiation signal $S_2$. When supplied with the above signal component from the engine condition detecting circuit 205, the PI control circuit 203 interrupts its own operation. Upon interruption of the supply of the above signal component to the control circuit 203, a pulse signal $S_5$ is outputted from the circuit 203 to the change-over circuit 209, which signal starts air/fuel ratio control with integral term correction. A preset value register 206 is provided in ECU 20, in which are stored the basic values of preset values $PS_{CR}$, $PS_{WOT}$, $PS_{IDL}$, $PS_{DEC}$ and $PS_{ACC}$ for the pulse motor position, applicable to various engine conditions, and atmospheric pressure correcting coefficients $C_{CR}$, $C_{WOT}$, $C_{IDL}$, $C_{DEC}$ and $C_{ACC}$ for these basic values. The engine condition detecting circuit 205 detects the operating condition of the engine based upon the activation of the O2 sensor and the values of engine rpm Ne, intake manifold absolute pressure $P_B$ and atmospheric pressure $P_A$ to read from the register 206 the basic value of a preset value corresponding to the detected operating condition of the engine and its corresponding correcting coefficient and apply same to an arithmetic circuit 207. The arithmetic circuit 207 performs arithmetic operation responsive to the value of the atmospheric pressure signal $P_A$, using the equation $PSi(P_A) = PSi + (760 - P_A) \times Ci$. The resulting preset value is applied to a comparator 210.

On the other hand, a reference position signal processing circuit 208 is provided in ECU 20, which is responsive to the output signal of the reference position detecting device (reed switch) 23, indicative of the switching of same, to produce a binary signal $S_6$ having a certain level from the start of the engine until it is detected that the pulse motor reaches the reference position. This binary signal $S_6$ is supplied to the change-over circuit 209 which in turn keeps the control signal $S_5$ from being transmitted from the PI control circuit 203 to a pulse motor driving signal generator 211 as long as it is supplied with this binary signal $S_6$, thus avoiding the interference of the operation of setting the pulse motor to the initial position with the operation of P-term/I-term control. The reference position signal processing circuit 208 also produces a pulse signal $S_7$ in response to the output signal of the reference position detecting device 23, which signal causes the pulse motor 13 to be driven in the step-increasing direction or in the step-decreasing direction so as to detect the reference position of the pulse motor 13. This signal $S_7$ is supplied directly to the pulse motor driving signal generator 211 to cause same to drive the pulse motor 13 until the reference position is detected. The reference position signal processing circuit 208 produces another pulse signal $S_8$ each time the reference position is detected. This pulse signal $S_8$ is supplied to a reference position register 212 in which the value of the reference position (e.g., 50 steps) is stored. This register 212 is responsive to the above signal $S_8$ to apply its stored value to one input terminal of the comparator 210 and to the input of a reversible counter 213. The reversible counter 213 is also supplied with an output pulse signal $S_9$ produced by the pulse motor driving signal generator 211 to count the pulses of the signal $S_9$ corresponding to the actual position of the pulse motor 13. When supplied with the stored value from the reference position register 212, the counter 213 has its counted value replaced by the value of the reference position of the pulse motor.

The counted value thus renewed is applied to the other input terminal of the comparator 210. Since the comparator 210 has its other input terminal supplied with the same pulse motor reference position value, as noted above, no output signal is supplied from the comparator 210 to the pulse motor driving signal generator 211 to thereby hold the pulse motor at the reference position with certainty. Subsequently, when the $O_2$ sensor 28 remains deactivated, an atmospheric pressure-compensated preset value $PS_{CR}(P_A)$ is outputted from the arithmetic circuit 207 to the one input terminal of the comparator 210 which in turn supplies an output signal $S_{10}$ corresponding to the difference between the preset value $PS_{CR}(P_A)$ and a counted value supplied from the reversible counter 213, to the pulse motor driving signal generator 211, to thereby achieve accurate control of the position of the pulse motor 13. Also, when the other open loop control conditions are detected by the engine condition detecting circuit 205, similar operations to that just mentioned above are carried out.

Figure 3:
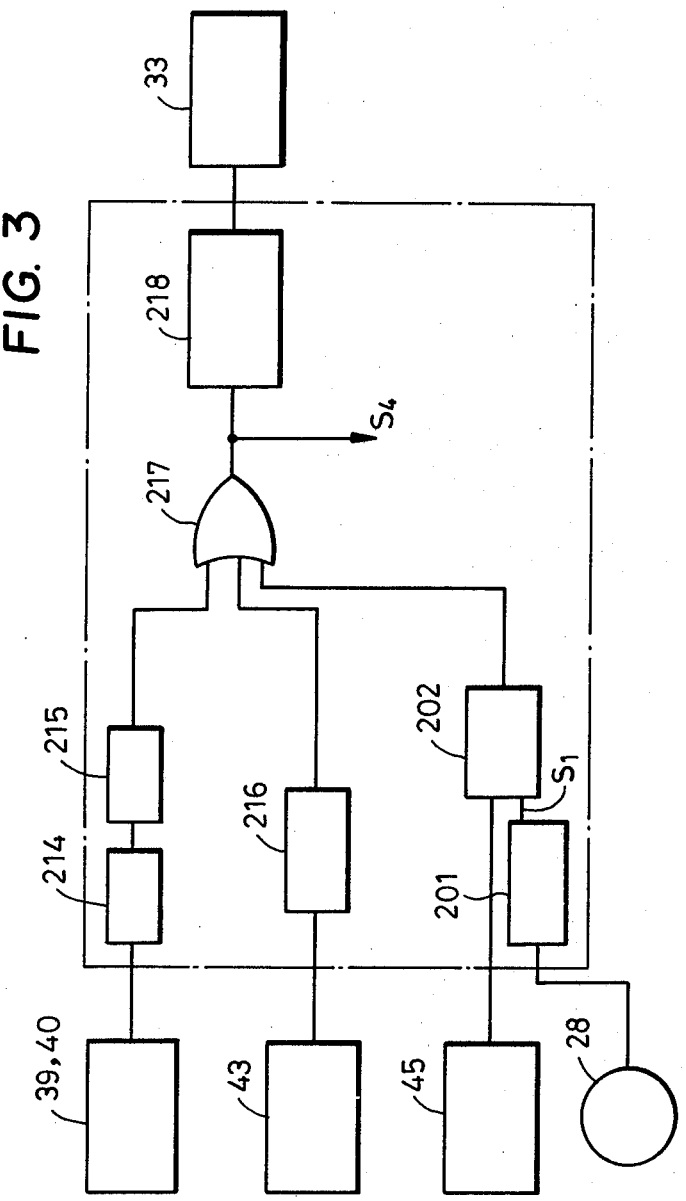
FIG. 3 is a block diagram illustrating the arrangement of a device for actuating the secondary air valve in FIG. 1 in synchronism with the air/fuel ratio open loop control according to the invention.

Referring to FIG. 3, there is shown a block diagram of a device which is provided in ECU 20 in FIG. 1 and operable to actuate the secondary air valve 30 in synchronism with fulfillment of open loop control conditions to avoid that the valve 30 is operated during air/fuel ratio feedback control.

The rpm sensor 39, 40 in FIG. 1 is connected to the input of an F-V (frequency-to-voltage) converter 214 for converting the engine rpm into a direct current voltage, which in turn has its output connected to the input of a comparator 215. This comparator 215 is arranged to compare an output voltage produced by the F-V converter 214 with a reference voltage corresponding to a predetermined engine rpm (1,000 rpm) to determine fulfillment of the aforementioned open loop control condition at engine idle. The comparator 215 is adapted to produce a binary output of 1 when the output voltage of the F-V converter 214 is lower than the reference voltage. The pressure sensor 43 in FIG. 1 is connected to the input of another comparator 216 which is arranged to compare the output voltage of the pressure sensor 43 with a reference voltage corresponding to a predetermined absolute pressure (200 mmHg) to determine fulfillment of the aforementioned open loop control condition at engine deceleration. This comparator 216 is adapted to produce a binary output of 1 when the output voltage of the pressure sensor 43 indicative of the absolute pressure in the intake manifold is lower than the reference voltage. The $O_2$ sensor 28 and the thermistor 45 in FIG. 1 are connected to the activation determining circuit 202, respectively, by way of the $O_2$ sensor activation detecting circuit 201 and directly, as previously noted with reference to FIG. 2. As previously mentioned, the activation detecting circuit 201 is adapted to supply the activation signal $S_1$ to the activation determining circuit 202 upon passage of the predetermined period of time $t_x$ (1 minute) after the output voltage of the $O_2$ sensor 28 has dropped below the predetermined value $V_x$ which is set so as to determine fulfillment of the air/fuel ratio control initiating condition. When supplied with the temperature signal Tw from the thermistor 45, indicative of a value exceeding the predetermined value (35° C.) which is set so as to determine fulfillment of the air/fuel ratio control initiating condition in addition to the above activation signal $S_1$, the activation determining circuit 202 supplies the air/fuel ratio control initiating signal $S_2$ to the PI control circuit 203 in FIG. 2, as previously noted. The circuit 202 is, however, adapted to produce a binary signal of 1 so long as only one of the above signals $S_1$ and Tw is supplied thereto.

The comparators 215, 216 and the activation determining circuit 202 have their respective outputs connected to corresponding input terminals of an OR circuit 217. This OR circuit 217 has its output connected to the input of a driving circuit 218 which in turn has its output connected to the solenoid 33c of the solenoid controlled valve 33 for control of the secondary air valve 30, to energize or deenergize the same solenoid. The above circuits 214 through 217 form part of the engine operating condition detecting circuit 205 in FIG. 2.

The operation of the above arrangement will now be described. At the start of the engine for instance, the activation determining circuit 202 is not yet supplied with the signal $S_1$ from the activation detecting circuit 201. At this stage, the circuit 202 produces a binary signal of 1 to cause the OR circuit 217 to produce a binary output of 1 when the temperature signal Tw outputted from the activation detecting circuit 201 shows a value lower than the predetermined value (35° C.). Accordingly, the driving circuit 218 energizes the solenoid 33c of the solenoid controlled valve 33 to cause the secondary air valve 30 to be opened to introduce atmospheric air (secondary air) into the exhaust manifold 27. The above binary signal of 1 outputted from the OR circuit 217 is also fed as the feedback control interrupting signal $S_4$ to the PI control circuit 203 in FIG. 2 to interrupt the air/fuel ratio feedback control.

When the engine rpm signal Ne outputted from the engine rpm sensor 39, 40 has a value lower than the predetermined value (1,000 rpm) (i.e., at engine idle), or when the signal $P_B$ representing the absolute pressure in the intake manifold 2, which is outputted from the pressure sensor 43, has a value lower than the predetermined value (200 mmHg) (i.e., at engine deceleration), the comparators 215, 216 both produce binary outputs of 1 to cause energization of the solenoid 33c of the solenoid controlled valve 33 through the OR circuit 217 and the driving circuit 218, to thereby actuate the secondary air valve 30 to introduce atmospheric air (secondary air) into the exhaust manifold 27. Also on this occasion, the output of 1 of the OR circuit 217 is fed as the feedback control interrupting signal $S_4$ to the PI control circuit 203 to interrupt the air/fuel ratio feedback control.

When none of the aforementioned three conditions for actuation of the solenoid controlled valve 33 is fulfilled, the comparators 215, 216 and the activation determining circuit 202 all produce binary outputs of 0 to keep the solenoid 33c of the solenoid controlled valve 33 deenergized to suspend the secondary air introduction, while simultaneously allowing the air/fuel ratio feedback control to be continued.

What is claimed is:

1. In an air/fuel ratio control system for performing feedback control of the air/fuel ratio of an air/fuel mixture being supplied to an internal combustion engine having an intake system and an exhaust system, which includes a three-way catalyst provided in said exhaust system of said engine, an $O_2$ sensor arranged in said exhaust system at a location upstream of said three-way catalyst for detecting the concentration of oxygen in exhaust gases emitted from said engine, and an electrical circuit operatively connecting said $O_2$ sensor in a manner effecting feedback control operation to control the air/fuel ratio in response to said $O_2$ sensor, the combination comprising: means for supplying atmospheric air as secondary air into said exhaust system at a zone between said engine and said $O_2$ sensor; an engine speed sensor for detecting the rotational speed of said engine;

a pressure sensor for detecting absolute pressure in said intake system; means for determining activation of said $O_2$ sensor; electrical means connected to said engine speed sensor, said pressure sensor and said $O_2$ sensor activation determining means for producing a feedback control interrupting signal when there occurs at least one of the conditions of engine idle, engine deceleration and deactivation of said $O_2$ sensor, and electrical means responsive to said feedback control interrupting signal to actuate, after the generation of said interrupting signal, said secondary air supply means.

2. In an air/fuel ratio control system for performing feedback control of the air/fuel ratio of an air/fuel mixture being supplied to an internal combustion engine having an intake system and an exhaust system, which includes a three-way catalyst provided in said exhaust system of said engine, an $O_2$ sensor arranged in said exhaust system at a location upstream of said three-way catalyst for detecting the concentration of oxygen in exhaust gases emitted from said engine, fuel quantity adjusting means for producing said mixture being supplied to said engine, and an electrical circuit operatively connecting said $O_2$ sensor with said fuel quantity adjusting means in a manner effecting feedback control operation to control the air/fuel ratio of said mixture to a predetermined value in response to an output signal produced by said $O_2$ sensor, the combination comprising: means for supplying atmospheric air as secondary air into said exhaust system at a zone between said engine and said $O_2$ sensor, an engine speed sensor for detecting the rotational speed of said engine; and a pressure sensor for detecting absolute pressure in said intake system; said electrical circuit including a first circuit for determining activation of said $O_2$ sensor, a second circuit responsive to output signals from said engine speed sensor, said pressure sensor and said first circuit thereby to produce a feedback control interrupting signal when there occurs at least one of the conditions of engine idle, engine deceleration and deactivation of said $O_2$ sensor, and a third circuit responsive to said feedback control interrupting signal for actuating said secondary air supply means.

3. The air/fuel ratio control system as claimed in claim 1 or 2, wherein said secondary air supply means comprises: an air passage communicating at one end thereof with said exhaust system of said engine and at another end thereof with atmospheric air, respectively; a reed valve arranged in said air passage for allowing flow of said atmospheric air solely toward said exhaust system; a valve arranged to close said air passage; means actuatable by negative pressure for actuating said valve; and a negative pressure passage communicating said negative pressure-actuated means with said intake system of said engine; said means for actuating said secondary air supply means comprising a three way valve connected to said negative pressure passage; wherein said three way valve is arranged to open said negative pressure passage at one position thereof, and close same and simultaneously allow introduction of atmospheric air into said negative pressure-actuated means at another position thereof, said three way valve being responsive to said feedback control interrupting signal to take said another position.

4. The air/fuel ratio control system as claimed in either claim 1 or 2 wherein said engine is in said condition of engine idle when said engine speed sensor produces an output signal indicative of an actual value of the rotational speed of said engine lower than a predetermined value.

5. The air/fuel ratio control system as claimed in either claim 1 or 2 wherein said engine is in said condition of deceleration when said pressure sensor produces an output signal indicative of an actual value of absolute pressure in said intake system lower than a predetermined value.

6. The air/fuel ratio control system as claimed in either claim 1 or 2 wherein said $O_2$ sensor is in said condition of deactivation when a predetermined period of time has elapsed after said $O_2$ sensor produces an output signal indicative of a voltage value lower than a predetermined value for the first time.

7. The air/fuel ratio control system as claimed in either claim 1 or 2 further including a temperature sensor for detecting the temperature of said engine, and wherein said $O_2$ sensor is in said condition of deactivation when a predetermined period of time has elapsed after said $O_2$ sensor produces an output signal indicative of a voltage value lower than a predetermined value for the first time, while simultaneously said temperature sensor produces an output signal indicative of an actual value of the temperature of said engine lower than a predetermined value.

8. A method of controlling an air/fuel ratio of an air/fuel mixture to an internal combustion engine having an intake system and an exhaust system, which includes a three-way catalyst provided in said exhaust system of said engine, comprising supplying atmospheric air as secondary air into said exhaust system at a zone between said engine and an $O_2$ sensor, detecting the rotational speed of said engine, detecting absolute pressure in said intake system, determining activation of said $O_2$ sensor, producing an electrical feedback control interrupting signal when there occurs at least one of the conditions of engine idle, engine deceleration and deactivation of said $O_2$ sensor, and, responsive to said feedback control interrupting signal, actuating said secondary air supply after the generation of said interrupting signal.

* * * * *